United States Patent [19]

Floriani et al.

[11] 3,920,745

[45] Nov. 18, 1975

[54] PROCESS FOR THE CATALYTIC HYDROGENATION OF UNSATURATED COMPOUNDS AND CATALYST EMPLOYABLE IN SUCH A PROCESS

[75] Inventors: Carlo Floriani, Pisa; Giuseppe Fachinetti, Fauglia, both of Italy

[73] Assignee: Snamprogetti S.p.A., San Donato Milanese, Italy

[22] Filed: Oct. 16, 1974

[21] Appl. No.: 515,227

[30] Foreign Application Priority Data

Oct. 16, 1973  Italy .................................. 30154/73

[52] U.S. Cl. ........ 260/683.9; 260/676 R; 260/666 P
[51] Int. Cl.² ....................... C07C 9/00; C07C 5/02
[58] Field of Search ..... 260/676, 683.9, 667, 666 P; 208/143

[56] References Cited
UNITED STATES PATENTS 3,663,635  5/1972  Lassall et al. .................... 260/683.9

FOREIGN PATENTS OR APPLICATIONS 13,851   3/1966   Japan .............................. 260/683.9
690,582  10/1960  Canada ........................... 260/666 P

OTHER PUBLICATIONS

Bulletin of "The Chemical Society of Japan" Vol. 39, pp. 1178–1182 (1966) The Homogeneous Hydrogenation of Acetylenes by Dicyclopentadienyl titanium dicarbonyl, Sonogoshira et al.

*Primary Examiner*—Delbert E. Gantz
*Assistant Examiner*—Juanita M. Nelson
*Attorney, Agent, or Firm*—Ralph M. Watson, Esq.

[57]  ABSTRACT

The present invention refers to a process for the catalytic hydrogenation of unsaturated compounds using as catalyst an acetylenic complex of titanium.

3 Claims, No Drawings

PROCESS FOR THE CATALYTIC HYDROGENATION OF UNSATURATED COMPOUNDS AND CATALYST EMPLOYABLE IN SUCH A PROCESS

It is known, from "Bulletin of the Chem. Soc. of Japan" — Vol. 39, pages 1178–1182 (1966), that it is possible to hydrogenate some acetylenic and olefinic compounds by employing, as catalyst, dicarbonyl dicyclopentadienyl titanium having the formula $Ti(C_5H_5)_2(CO)_2$.

However this catalyst does not prove to be sufficiently active since it needs high hydrogen pressures (about 50 atmospheres) and relatively high temperatures and, moreover, it is uneffective in the hydrogenation of many organic compounds.

It has now been found that, if, instead of dicarbonyl dicyclopentadienyl titanium, use is made of a catalyst constituted by the reaction product thereof with an acetylenic compound, the obtained product has a very higher catalytic activity.

Therefore a first object of the present invention consists of a hydrogenation process of olefinic or acetylenic compounds carried out at room temperature and at light hydrogen pressures in presence of a catalyst constituted by a complex of titanium with an acetylenic derivative and carbon monoxide.

A second object of the present invention is constituted by a hydrogenation catalyst having the formula

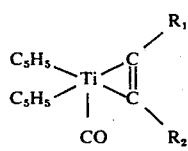

wherein $R_1$ and $R_2$ may be hydrogen, alkyl, aryl or cycloalkyl radicals having up to 10 carbon atoms.

A third object of the present invention is constituted by the process for the preparation of the abovesaid catalyst.

The hydrogenation process of unsaturated compounds according to the present invention involves the employment of a hydrogenation catalyst as abovesaid and is preferably carried out in solution of a solvent inert with respect to the reagents and the reaction products.

Preferably it is carried out in presence of aliphatic, cycloalophatic or aromatic hydrocarbons provided that they are liquid at the reaction temperature.

The reaction temperature may range from 0° to 50°C, preferably the operations are performed at room temperature.

The hydrogen pressure is not a critical factor as to the hydrogenation reaction; however, for the procedure convenience, the process is carried out at a pressure ranging from 1 to 5 absolute atmospheres, preferably at the atmospheric pressure.

The inventive hydrogenation reaction may be carried out starting from any organic compound which have at least one ethylenic or acetylenic unsaturation and do not react with the catalyst.

According to what aforesaid the hydrogenation can be performed on olefines such as ethylene, propylene, butenes, pentenes, hexenes, cyclohexenes, heptenes and the like, diolefins such as butadiene, isoprene, phenylbutadiene, diphenylbutadiene, pentadienes, cyclooctadienes, acetylenic compounds such as methylacetylene, phenyl-acetylene, diphenyl-acetylene.

In its turn, the catalyst employed in the inventive hydrogenation process, is obtained by simply reacting dicarbonyl dicyclopentadienyl titanium complex with a compound having the formula $$R_1 - C \equiv C - R_2$$

in which $R_1$ and $R_2$ have the abovesaid meanings.

The reaction is carried out in an inert solvent at temperature ranging from 0° to 50°C. The product, in such a way obtained, is fastly removed from the solvent.

However the invention will be more understable by examining the following examples, which detail all operative formalities.

EXAMPLE 1

Preparation of $Ph_2C_2(CO)Ticp_2$ 400 cc of heptane were added to a mixture of $Ticp_2(CO)_2$ (4.2 g) and $Ph_2C_2$ (6.7 g) in the solid state. The solution, clear and stirred (25°C by a thermostat), was continuosly Kept under vacuum (lightly open water pump); a microcrystalline gold-yellow solid began separating after four hours. After 24 hours the reaction was stopped (final volume 500 cc). The solid was filtered and washed by heptane. Yield was 3.5 g.

| Analysis: theoretical | $C = 78.2$ | $H = 5.22$ |
| --- | --- | --- |
| found | $C = 78.20$ | $H = 5.25$ |
| $\nu\ CO = 2000\ cm^{-1}$ | | $\nu\ C=C = 1780\ cm^{-1}$ (Nujol) |
| n.m.r. ($C_6D_6$) multiplet | | at 2.9 $\tau$ (10 H, Ph) |
| singolet | | at 5.0 $\tau$ (10 H, cp) |

EXAMPLE 2

A solution was prepared from 0.15 g of $Tiop_2(CO)Ph_2C_2$ in 50 cc of heptane, whereto were added 1.5 g of $PhCH=CH - CH=CH - Ph$ (which is little soluble in heptane). Hydrogen was input and a fast adsorption occurred over 15 minutes, while the whole olefin was passing into the solution.

It was subjected to air in order to oxidize the catalyst which gave rise to substances insoluble in heptane. Through thin layer cromatography a main product was identified together with traces of dibenzyl arosen from the catalyst.

The raw product, after the evaporation of heptane, was again crystallized from heptane and gave 1.2 g of product having a melting point of 53° – 54°C (scientific papers: 52° – 53°C) which was also identified through N.M.R. way.

EXAMPLES 3 – 7

The following examples refer to the hydrogenation of various organic substrates at room temperature and pressure, carried out according to the formalities of the preceding example.

In the table we reported, for the sake of comparison, hydrogenation tests of the same organic substrated by using, as catalyst, the inventive compound and titanium diciclopentadienyl dicarbonyl.

The data clearly show our compound is a catalyst much more active than the known compound.

TABLE

Catalyst hydrogenation in presence of Ti(C₅H₅)₂(CO)₂ or of Ti(C₅H₅)₂)PhC₂Ph)(CO)
Conditions: 1 atm. H₂. Room temperature, heptane as solvent (50 cc)

| Olefin or acetilenic compound | mmoles | TiCp₂(CO)₂ mmoles | TiCp₂(PhC₂Ph)(CO) mmoles | Sub/cat ratio | Reaction Time | % hydrogenated |
|---|---|---|---|---|---|---|
| PhC ≡ CPh | 2.8 | 0.77 | | 3.6 | 3 hr | 30 % PhCH₂CH₂Ph |
| " | 5.5 | | 0.39 | 14.5 | 1–3 min | 100% PhCH₂CH₂Ph |
| trans-stylbene | 5.55 | 0.64 | | 8.7 | 5 hr | no reaction |
| " | 5.55 | | 0.34 | 16.3 | 15 min | 100% PhCH₂CH₂Ph |
| PhCH=CH—CH=CH-Ph | 6.95 | 0.77 | | 9.0 | 3 hr | no reaction |
| " | 6.95 | | 0.49 | 18.0 | 15 min | 100% Ph(CH₂)₄Ph |
| cyclohexene | 18.3 | 0.60 | | 32.0 | 24 hr | no reaction |
| " | 18.3 | | 0.39 | 47.0 | 14 hr | 90 % cyclohexene |
| 1 — octene | not tested | | n.d. | | | |
| 1 — octene | | | | ≥50.0 | 5 min | 100% octane |

What we claim is:

1. Process for the hydrogenation of ethylenically or acetylenically unsaturated hydrocarbons characterized in that the reaction is carried out in the presence of a catalyst, having the formula

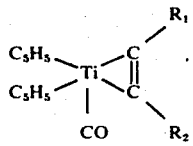

in which $R_1$ and $R_2$ are hydrogen, alkyl, aryl or cycloalkyl radicals having up to 10 carbon atoms.

2. Process according to claim 1 characterized in that the reaction is carried out at temperatures ranging from 0° to 50°C.

3. Process according to claim 1 characterized in that the reaction is carried out in the presence of a solvent inert thereto, generally selected from the saturated hydrocarbons.

* * * * *